July 15, 1969 R. N. JACKSON ET AL 3,456,071

INFORMATION TRANSMISSION SYSTEM

Filed June 22, 1966 4 Sheets-Sheet 1

INVENTORS
RICHARD N. JACKSON
KENNETH G. FREEMAN

BY

Frank R. Trifari

AGENT

INVENTORS
RICHARD N. JACKSON
KENNETH G. FREEMAN
BY
Frank R. Trifari
AGENT

INVENTORS
RICHARD N. JACKSON
KENNETH G. FREEMAN
BY
Frank R. Jeffrey [signature]
AGENT INVENTORS
RICHARD N. JACKSON
KENNETH G. FREEMAN
BY
[signature]
AGENT

United States Patent Office 3,456,071

Patented July 15, 1969

3,456,071

INFORMATION TRANSMISSION SYSTEM

Richard Norman Jackson and Kenneth George Freeman, Horley, England, assignors, by mesne assignments, to U.S. Philips Corporation, New York, N.Y., a corporation of Delaware Filed June 22, 1966, Ser. No. 559,581
Claims priority, application Great Britain, July 15, 1965, and Nov. 12, 1965, 30,075/65 (provisional); Apr. 6, 1966, 48,119/65 (complete)
Int. Cl. H04n 5/38, 7/00
U.S. Cl. 178—5.6 10 Claims This invention relates to a method of television transmission, More especially, it relates to the application of television systems for education.

The role of television in education is being widely studied, both as a "visual aid"—for instance to assist in demonstrations—and as a medium for the dissemination of learning to a wide audience.

One major factor which is holding back such applications of television is the widespread conviction that the amount of information involved and the number of channels needed are very great. This problem has arisen in its most acute form in connection with recent discussions about the possibility of a "University of the Air."

Typically, C. Chataway has expressed himself as follows (British Conservative Party pamphlet entitled "Education and Television," March 1965): "It has been estimated that to cover the degree courses available in the average university, let alone other technical courses and post-graduate retraining, five or six channels would need to be broadcasting day and night. Even in three hours of peak viewing time a night, television could touch at only a few points the great variety of courses that lead to degrees and other qualifications. It is doubtful, anyway, whether this is an economical use of expensive peak viewing time."

A similar view can be found in "Where" (No. 18, page 29, autumn, 1964) in an article entitled, "Towards an Open University," by M. Young. Young writes as follows:

"First, what should not be done—broadcasting should not be used for direct teaching of registered students, and for that alone. Channel time will be too limited." And later: "On this basis, of 600 hours a year for each degree, even with its own channel, the college would not be able to cover more than about seven degree courses, and that would not be anywhere near adequate even for the whole range of degree courses required, without allowing anything for all the other lower-level courses for which the college would be responsible. The cost would also be against such a disposition."

In current discussions on this topic one important fact appears to have been ignored or, at least, neglected, namely, the fact that motion is often unnecessary for educational programmes. Thus a series of stills will often do nearly as well, with consequent introduction of a very large amount of redundancy.

Systems which may employ stills are described in patent specification No. 556,519, filed June 9, 1966.

It is an object of the invention to provide improved systems which utilize such redundancy for the purpose of reducing drastically the cost and bandwidth or transmission time needed for a given set of instructional television programmes.

In patent specification No. 556,518 filed June 9, 1966, now abandoned, a television system is proposed which employs at the transmitter end several sources for picking up a plurality of programmes. This plurality of programmes are sequentially transmitted by a single transmitter but none of these programmes can be received using a normal domestic television receiver. Thus, in order not to interrupt normal broadcast services, it would be necessary to put into service a new transmitter to operate such a system at peak viewing times. It is an object of the present invention to provide a method whereby educational programmes may be transmitted by a normal broadcast television transmitter during normal service hours, without interrupting the service.

Normal television transmissions in Europe operate with a picture repetition rate of 25 pictures (50 fields 20:1 interlaced) per second (in the U.S. it is 30 pictures per second) but it is well known that a rate of about 16 pictures per second is sufficient for the smooth portrayal of motion in the pictures (normal "home movie" projection apparatus operate at this picture rate). Thus it is apparent that some of the transmitted frames of a broadcast television are redundant, even when motion is to be portrayed. It is an object of the invention to use some of this redundancy for the transmission of educational material in such a way that the interposed material does not materially impair the reproduction of the normal programme on a standard receiver, and in such manner that it is possible to transmit one or more educational programmes within the same transmission channel as a normal continuous (e.g., broadcast) programme.

It has previously been suggested that occasional fields could be interposed in a normal television system which fields would be displayed and would carry information different from that of the other fields. This technique has been proposed for so-called "subliminal" advertising.

Therefore the present invention is characterized in that in the method of television transmission in accordance with the invention a majority of fields appertaining to a normal continuous programme is transmitted while interposing at intervals a minority of fields containing information appertaining to a discontinuous programme constituted by a series of stills is transmitted, the interposed field being represented by video signals which are so arranged that they can be recognised by a receiver and can thus be selectively either extracted for separate viewing or substantially suppressed in favour of the continuous programme (by contrast, the signals of the interposed fields of the "subliminal" method are normal and cannot be recognised by the receiver and, of course, are not intended to be).

The recognition of the interposed fields may be achieved, for example, by including in the composite video signal of an interposed field identification signals which can be recognized both by a special (educational) receiver and a normal (broadcast) receiver.

Alternatively, the interposed fields may be transmitted in pairs in which the video modulation of one field is inverted with reference to the other so as to provide substantially visual cancellation (without recognition) in a normal receiver (in this case recognition is still used in a special receiver as will be explained in greater detail later).

The special information contained in the stills of the discontinuous programme may, for example, appertain to some monitoring or warning system or the like. However, the invention is mainly concerned with educational material and the following description will be based on this assumption for convenience.

The interposed fields may contain solely educational information or a combination of educational and broadcast information as will also be explained.

Using such techniques, an educational programme can be transmitted during a normal broadcast transmission, for example by interposing one field of the educational programme in place of every 50th field of the normal program. Thus the normal programme would have 49 transmitted fields per second and the educational programme 1 field per second. The educational programme image can be extracted by suitable circuits in a specially constructed receiver whilst its presence will not interfere unduly with the reception of the broadcast programme on a normal receiver on account of its low duty cycle and the special measures which can be taken.

Embodiments of the invention will now be described by way of example with reference to the accompanying diagrammatic drawings in which:

FIG. 6 shows signals as used in the system.

FIG. 1 shows a television signal in which the field 1, 2 . . . 49, 50, etc., are fields containing the normal B.T.V. programme while field 50 is the E.T.V. field.

Figures 2, 3:
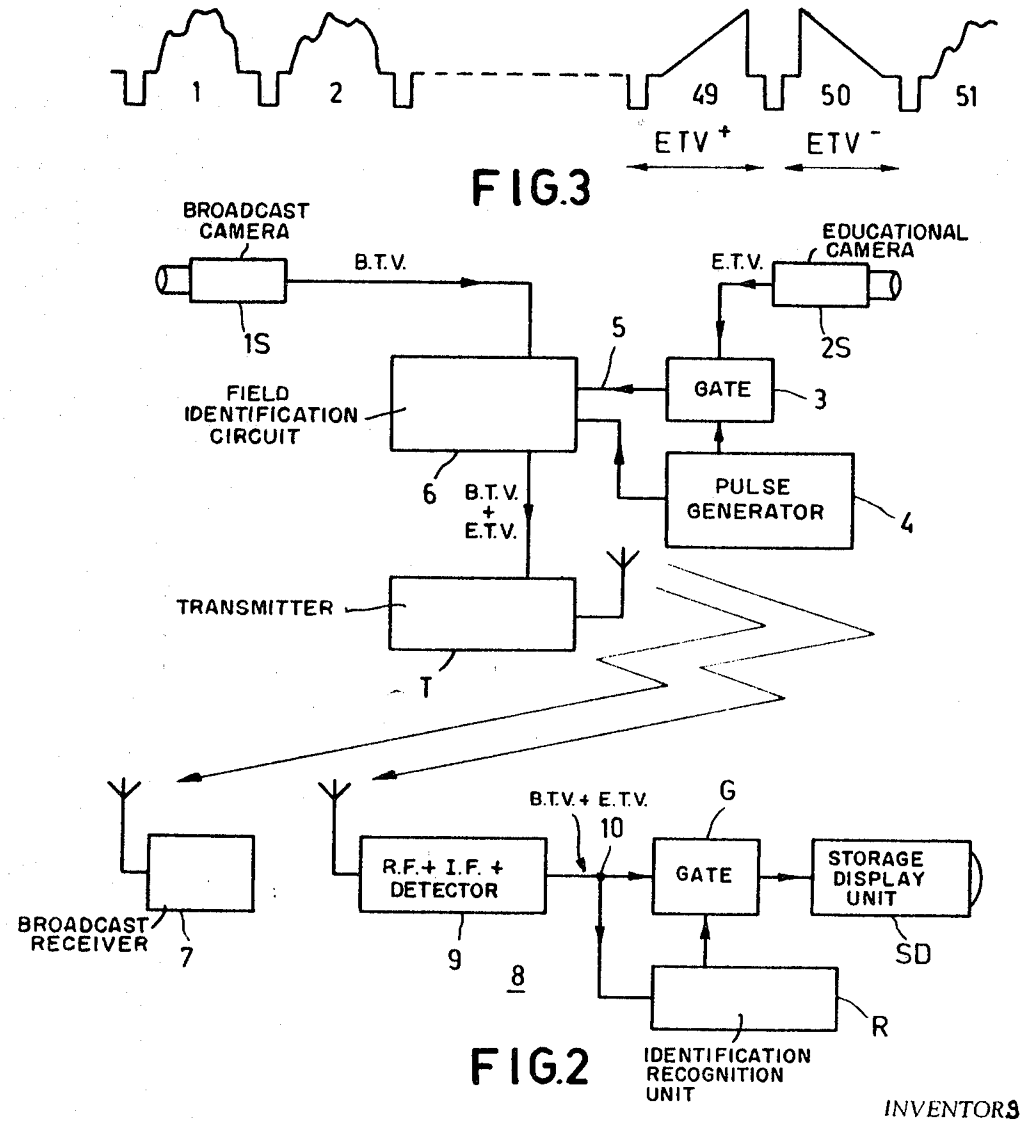
FIG. 2 shows an arrangement for a television system based on the method of FIG. 1. The interposed frames carry an identification pulse which enables a special receiver to select them and store them for display.
FIG. 3 shows another manner how an E.T.V. field can fit into a normal B.T.V. programme.

In spite of the low repetition rate of the E.T.V. fields, there may be a difficulty in the case of a normal B.T.V. receiver used to display the B.T.V. programme. In fact, in areas of low brightness information in the broadcast (entertainment) programme (B.T.V.) interference may be perceived from the educational (E.T.V.) field. To overcome this difficulty it is possible to modify the system so that instead of interposing each time one E.T.V. field of the same polarity, instead there are interposed two substantially identical fields (e.g., two interlaced fields) of opposite polarity (excluding synchronisation pulses) so that over two E.T.V. fields visual cancellation will occur to give only a slight constant brightness change to the entertainment pictures. Obviously a number of arrangements are possible. The complementary pair of E.T.V. fields may be time-adjacent, as indicated in FIG. 3, or they may be separated by some convenient number of fields. In either case the transmitter and the E.T.V. receiver much each be modified so that one of the two interposed E.T.V. fields is inverted at the transmitter and is subsequently restored to the correct polarity in the receiver. This implies that the identification system must be capable of showing not only which of the fields of the transmission belongs to the E.T.V. programme, but also which is the inverted field.

Normally, of course, it is necessary to provide $\gamma$-correction at the transmitter for the cathode ray tube characteristics. Two ways of effecting gamma correction for the proposed system will now be described.

If there is gamma correction after forming the interposed composite video signal one gets:

$$E.T.V.^{+}=V^{1/\gamma}$$
$$E.T.V.^{-}=(1-V)^{1/\gamma} \qquad (1)$$

where E.T.V.+ is a positive or normal field and E.T.V.− is an inverted field.

Such a signal will give visual cancellation at the screen of the broadcast television receiver but the gamma correction of E.T.V.− is incorrect (after inversion of polarity) for the purpose of giving the right E.T.V. signal. Thus the E.T.V. receiver would require an additional circuit to provide correct gamma correction for the inverted field signal.

To obtain correct E.T.V. operation without such an additional circuit game correction is effected before interposing the E.T.V. signal into the normal programme.

In this case the transmitted signals are:

$$E.T.V.^{+}=V^{1/\gamma}$$
$$E.T.V.^{-}=(1-V)^{1/\gamma} \qquad (2)$$

The latter after inversion in the E.T.V. receiver gives another field of E.T.V.+ (apart from a constant term which can be removed).

Howevr, at the screen of the cathode ray tube of the B.T.V. receiver the signals are now:

$$(E.T.V.^{+})=(V^{1/\gamma})^{\gamma}=V$$
$$(E.T.V.^{-})=\{1-V^{1/\gamma}\}^{\gamma} \qquad (3)$$

and the net signal over two fields is $$(E.T.V.^{+})+(E.T.V.^{-})=V+\{1-V^{1/\gamma}\}^{\gamma} \qquad (4)$$

When $V=0$ this becomes 1 with average value ½ and when $V=1$ this again becomes 1 with average value ½, but in general it is not independent of the signal level and some inteference will still occur. However, this will still be less than with the single interposed field system, and it can be shown that (assuming a typical value for $\gamma$ of about 2) there is at least a 4:1 improvement in the interference introduced by the two field inversion case as comparted with the single field case. In addition to the field inversion cancellation described, the visibility of the interposed fields may be still fruther reduced, if desired, by a suitable adjustment of the amplitude of the interposed video signals relative to the B.T.V. signal. If for instance the E.T.V. amplitude were reduced then the brightness of the cancelled fields in the normal B.T.V. receiver would also be reduced. It may thus be desirable to adjust the amplitude of the E.T.V. signal so that the effective brightness level of the cancelled frames is close to the mean brightness level of the B.T.V. signal. In this way a minimum of flicker interference may be achieved. Thus adjustment may either be static so that the effective E.T.V. brightness level approximates to the mean level for an assumed average television picture; or it may, within limits, be continuously adjusted at the transmitter to suit the actual transmitted B.T.V. field. In the latter case some form of automatic gain control must be incorporated in the E.T.V. receiver to ensure a constant displayed picture.

As an alternative to, or in addition to, the above measures it may be desirable to alter the timing of the interpositon of E.T.V. fields so as to avoid as far as possible the interposition of fields during periods when there is a large difference between the mean brightness level of the B.T.V. fields and that of the cancelled E.T.V. fields.

A disadvantage of the above methods is that, although the "interfereing" E.T.V. fields are cancelled the wanted B.T.V. fields are also absent so that there is a short gap in the information context of the B.T.V. programme. Although this may hardly be noticeable to adopt an alternative arrangement which allows some of the original B.T.V. programme to continue in the gap.

This alternative arrangement is to transmit signals corresponding to the sum of the two signals (B.T.V. and E.T.V) for the first field and the difference of the two signals for the second field. It must of course be arranged that the peak value of the sum of the signals does not exceed the normal maximum signal amplitude of the transmitter and that the value of the difference of the signals does not become negative since this would interfere with synvchronisation. These difficulties can be overcome by taking suitable proportions of the two signals and by the addition of suitable D.C. components.

These signals are formed as follows:

Let the Entertainment signal be $V_B$ and the Education signal be $V_E$ and ignore, for the time being, the necessity for $\gamma$ correction.

The sum signal is given by adding ½ of each of these signals:

$$V_{sum}=\tfrac{1}{2}(V_B+V_E)$$

Figure 1:
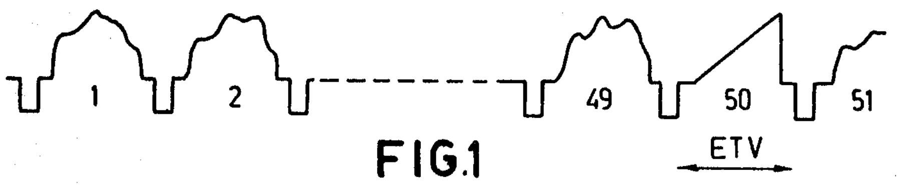
FIG. 1 shows how an Educational Television (E.T.V.) field can fit into the field sequence of a normal Broadcast (entertainment) Television (B.T.V.) programme.

The difference signal is formed by first inverting the education signal in a similar manner to that described with reference to FIGS. 1 to 3:

$$V_{E'}=(1-V_E)$$

One half of this signal is then added to the one half of the B.T.V. signal to give the required difference signal:

$$V_{diff.}=\tfrac{1}{2}V_B+\tfrac{1}{2}(1-V_E)=\tfrac{1}{2}+\tfrac{1}{2}(V_B-V_E$$

It can be seen that this amounts to adding a D.C. component of ½ the peak signal to ½ the difference of the two original signals.

Supposing that the maximum possible value of each signal is 1; then by this method the maximum possible values of the sum and difference signals are also unity and the minimum value is zero.

In the normal B.T.V. receiver no special arrangements are needed. Thus when an E.T.V. picture is transmitted the B.T.V. receiver will display for the first field the signal:

$$V_{sum}=\tfrac{1}{2}(V_B+V_E) \qquad (1)$$

and for the second:

$$V_{diff.}=\tfrac{1}{2}+\tfrac{1}{2}(V_B-V_E) \qquad (2)$$

Over two fields, therefore, the net or average output will be:

$$=[\tfrac{1}{2}(V_B+V_E)+\tfrac{1}{2}+\tfrac{1}{2}(V_B-V_E)]\div 2=\tfrac{1}{4}+\tfrac{1}{2}V_B$$

Thus the average output is seen to consist of the normal B.T.V. signal at half amplitude, plus a D.C. "sit" component at ¼ of the peak white signal value. This is as compared with no B.T.V. signal and a D.C. component of ½ peak white in the case previously described with reference to FIGS. 1 to 3.

In the E.T.V. receiver special arrangement must be made to reconstitute the E.T.V. signal. As before it is necessary to recognise the E.TV. fields and abstract them from the incoming signal. They must also be stored for presentation. The precise method of handling, however, depends upon the number of interposed fields pertaining to each E.T.V. picture and the quality of display required.

In the simplest decoding method the recognition circuits determine which of the E.T.V. fields is a "difference" field and these are then passed through an inverter stage. The output of this inverter has thus the form:

$$1-[\tfrac{1}{2}+\tfrac{1}{2}(V_B-V_E)]=\tfrac{1}{2}+\tfrac{1}{2}(V_E-V_B)$$

The "sum" fields and the inverted difference fields above may then be displayed on a long persistence phosphor C.R.T. (if the time intervals between fields are sufficiently short) or written into a storage tube which may then continuously be read out for display by a normal T.V. tube.

Embodiments based on this method will be described with reference to FIGS. 2, 4 and 5.

FIG. 2 shows the total T.V. transmission system. At the transmitter end there is a first camera $1_s$ for the broadcast television (B.T.V.) programmes. The second camera $2_s$ delivers the educational television (E.T.V.) programmes.

The signal from camera $2_s$ is applied to a video gate 3 which is controlled by an identification and gate pulse generator 4 which opens the gate 3 at the moments an E.T.V. field signal should be applied through lead 5 to a field identification insertion circuit 6. To circuit 6 are also applied the B.T.V. fields so that in this circuit the signals are formed as shown in FIGS. 1 or 3. Moreover, as will be explained more fully with the aid of FIG. 6, identification signals obtained from generator 4 are also applied to circuit 6. So special identification signals are added to the video signal during field blanking periods in order to identify at a special E.T.V. receiver the E.T.V. fields. So with these identification signals it is possible to separate the E.T.V. fields from the B.T.V. fields and, if necessary, transform them in order that they are ready for display.

The total signal with B.T.V.–E.T.V. fields and identification signals is then applied to the transmitter T, which transmits them over air (as shown) or by cable (not shown) to the various receivers.

So the transmitted signals can reach a normal receiver 7, which can display the B.T.V. fields and a special E.T.V. receiver 8 which can display the E.T.V. fields.

The E.T.V. receiver 8 consists of a first stage 9, a video gate G, a storage display unit SD and an identification recognition unit R. Stage 9 comprises the radio and intermediate frequency stages and the detector. This stage is of normal construction and is common to all the special embodiments as shown in FIGS. 4, 5 and 7. So at terminal 10 the detected television signal comprising both B.T.V. and E.T.V. fields is present.

It is assumed in the following description that the E.T.V. fields are in fact combined fields. That is to say the field 49 as shown in FIG. 3 is always a sum field as determined by Formula 1 and field 50 is a difference field as determined by Formula 2. These sum and difference fields are called combined E.T.V./B.T.V. fields.

Figure 4:
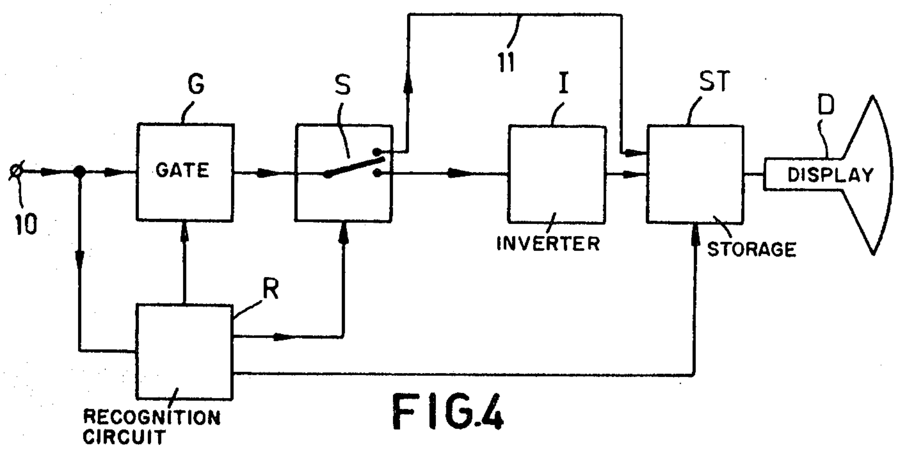
FIG. 4 shows a first form of a detailed receiver for receiving, storing and displaying the E.T.V. signal.

Referring to FIG. 4 the operation is as follows:

The incoming B.T.V. and combined E.T.V./B.T.V. field signals at terminal 10 are fed into recognition circuit R and a video gate circuit G. The recognition circuit R, initiated by the identification signals, causes the gate G to open only when a combined field is present. The combined fields are then passed to the switch S. In response to instructions from the recognition circuit R the switch S diverts the difference fields $V_{diff.}$ to the inverter stage I and sum fields $V_{sum}$ to the direct path 11. The direct and inverted fields are then passed to the store ST and display unit D. Unless a long persistence phosphor display tube D is used (in which case store ST is not necessary), it will also be necessary to provide "mode switching" signals to the store ST from the recognition circuit 12. These mode switching signals determine when the store ST changes from a read-in mode to a read-out mode. When such a simple system is used in an E.T.V. receiver cancellation of unwanted B.T.V. signals occurs by visual integration only and the effective signal (over two fields) will be:

$$[\tfrac{1}{2}(V_B+V_E)+\tfrac{1}{2}+\tfrac{1}{2}(V_E-V_B)]\div 2=\tfrac{1}{4}+\tfrac{1}{2}V_E$$

This signal carries an unwanted D.C. component which will reduce the contrast range of the display. In order to overcome this, two storage tubes $S_1$ and $S_2$ may be used as shown in FIG. 5.

Figure 5:
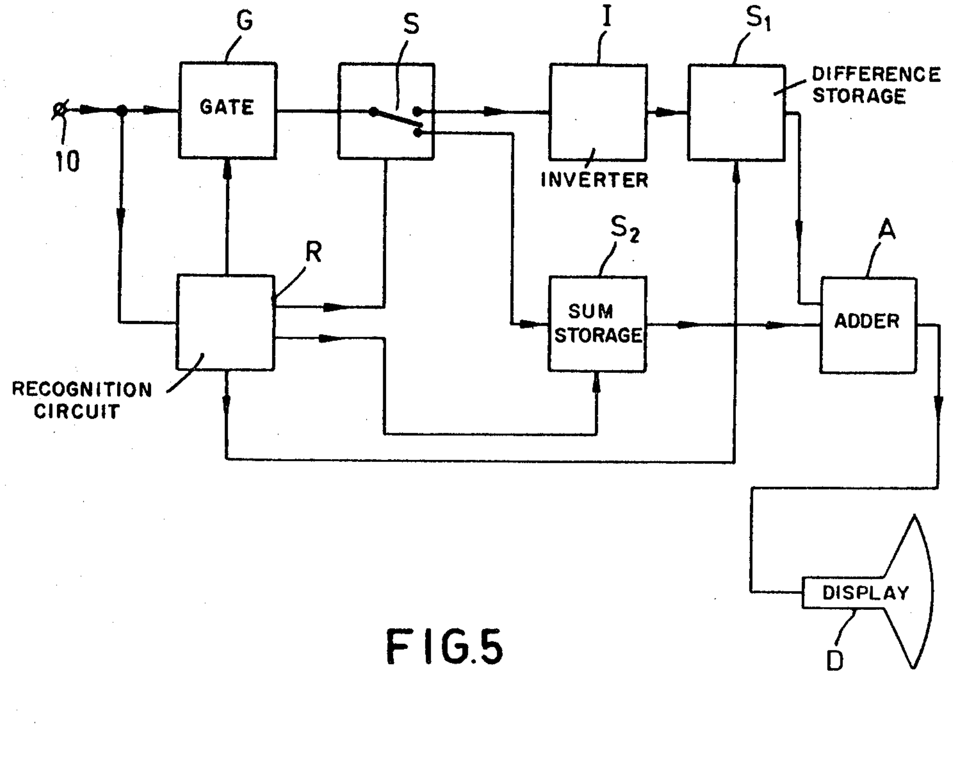
FIG. 5 shows a second form of such a detailed receiver.
Figures 6A, 6B, 6C, 6D, 6E, 7:
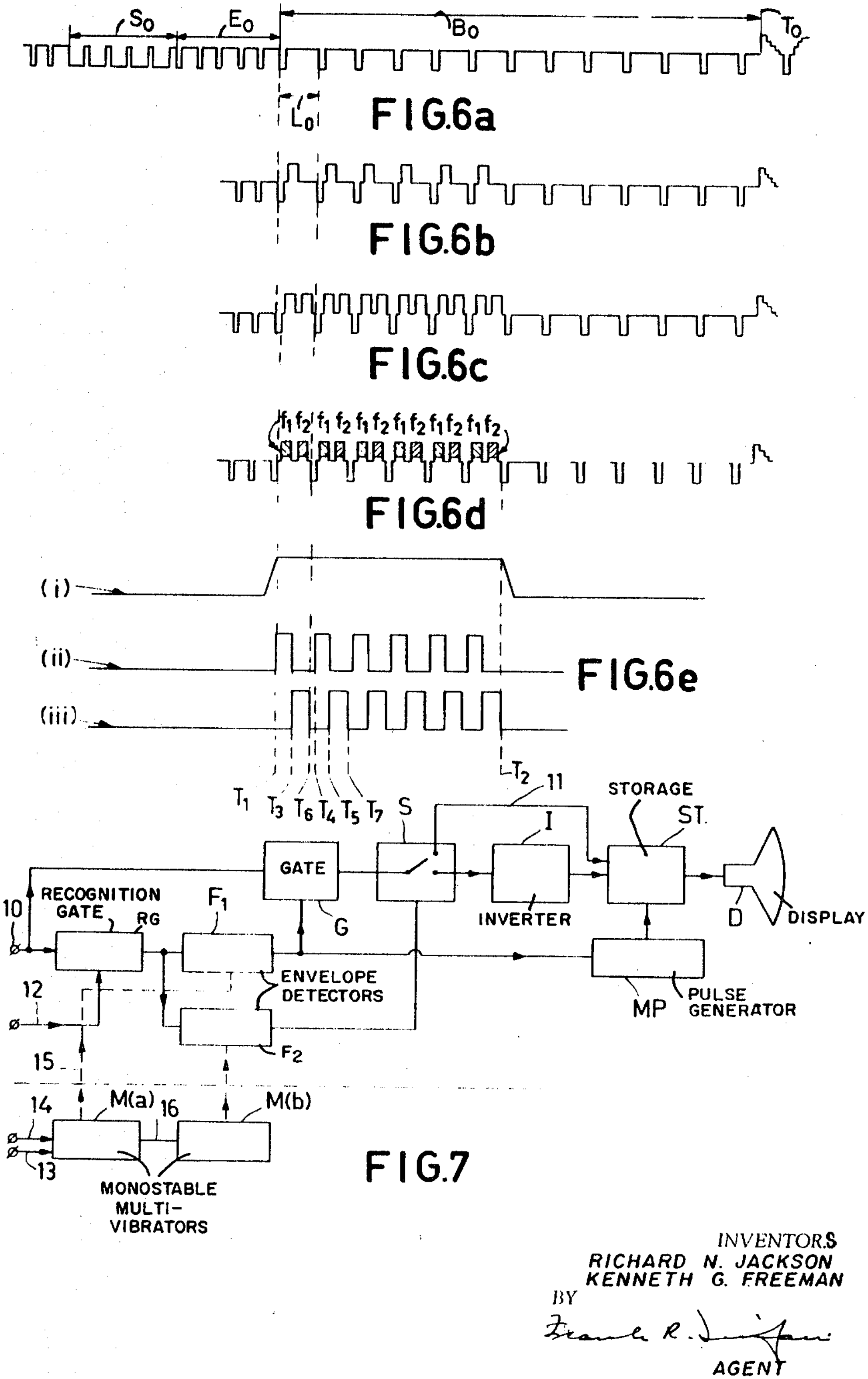
FIG. 7 shows a further detailed diagram of a receiver for receiving the E.T.V. field.

There are two possible ways of operating the arrangement of FIG. 5 according to the transmission arrangements. First it may be arranged that, at the transmitter end, the interposed signals carrying E.T.V. information consist of pairs of fields which together make a single interlaced picture. One field of each pair is then a "sum" signal $V_{sum}$ and the other a "difference" signal $V_{diff.}$. In this case the sum and difference signals pass through gate G to switch S as before and are routed so that the difference signals are inverted. The inverted difference signals $V_{diff.}$ are stored in store $S_1$ and the sum signals $V_{sum}$ in store $S_2$. After *both* stores have their appropriate fields read in, the two stores are read out simultaneously and the output signals are summed in the adder circuit A. The output of this adder is passed to the display tube D. The read-in and read-out actions of stores $S_1$ and $S_2$ are controlled by mode switching pulses applied to these stores from the recognition circuit R.

The disadvantage of this method is that the vertical resolution of the picture is reduced by a factor of two since each line of the display is derived from a combination of two original lines. If, however, the transmission is changed to cover four fields, this can be overcome. Two interlaced fields are transmitted as sum signals $V_{sum}$ and fed to store $S_1$ and two further interlaced fields are transmitted as difference signals $V_{diff.}$ and fed to store $S_2$. With simultaneous read-out two full-definition pictures are obtained, although the four fields may have been received in any order.

It should be noted that, since true signal addition can be obtained by this method rather than mere visual integration, the unwanted D.C. component can readily be removed from the output signal and a correct display can be obtained.

It is desirable not to have to use two stores and these two possibilities are available:

(1) With the "two-field" system store $S_2$ is eliminated and both fields are read into store $S_1$. For read-out the storage tube spot is elongated to read the mean of two lines at a time, one from each interlaced field.

(2) With the "four-field" system store $S_2$ is again eliminated. The two interlaced sum fields are read into store $S_1$ and the two interlaced difference fields $V_{diff.}$ are superimposed on the sum fields $V_{sum}$ so that the summation is performed on the storage target.

Still there is not dealt with the difficult problem of gamma. For minimum visibility of E.T.V. fields on the B.T.V. receivers it is necessary to transmit $(V_{sum})^{1/\gamma}$ and $(V_{diff.})^{1/\gamma}$ where $\gamma$ is the power law of the receiver cathode ray tube characteristic. If this is done then the E.T.V. receiver must make gamma adjustments to the signals for correct presentation.

These two alternative possibilities exist to reduce the complexity of the E.T.V. receiver. Ignoring the gamma of the stores:

(1) For the "true addition" system of FIG. 5 or for its single-store equivalent it may be best to gamma-correct the individual signals $V_B$ and $V_E$, so that the transmitted signals are $$V_{sum}=\tfrac{1}{2}V_B^{1/\gamma}+\tfrac{1}{2}V_E^{1/\gamma}$$

and $$V_{diff.}=\tfrac{1}{2}+\tfrac{1}{2}V_B^{1/\gamma}-\tfrac{1}{2}V_E^{1/\gamma}$$

(2) For the FIG. 4 visual cancellation E.T.V. receiver the sum signal is gamma corrected after signal addition and the difference signal is derived in an alternative way. First the signal $\tfrac{1}{2}+\tfrac{1}{2}(V_E-V_B)$ is formed. This is then gamma-corrected and inverted before transmission. The transmitted difference signal is thus:

$$1-[\tfrac{1}{2}+\tfrac{1}{2}(V_E-V_B)]^{1/\gamma}$$

After inversion in the E.T.V. receiver this signal has the desired form.

Both of these forms of gamma correction result in incomplete cancellation of the E.T.V. signal in the B.T.V. receiver.

In the above arrangements according to FIGS. 2, 4 and 5 it is necessary to provide means for determining, at the E.T.V. receiver.

(a) When an E.T.V. frame is present in the signal.

(b) Whether the E.T.V. frame, if present, is transmitted as a normal positive signal or a negative signal (or whether it is a "sum" signal $V_{sum}$ or a "difference" signal $V_{diff.}$).

There are a number of ways in which this may be accomplished but one very convenient method is to make use of the intervals of field blanking which occur between successive fields of a normal television signal waveform. FIG. 6(*a*) shows part of a typical television waveform for a 625 line system during such a period. During this field blanking period there is a period $S_0$, during which the field synchronising signals are transmitted, a period $E_0$ for the equalizing pulses and a blank period $B_0$ during which no video information is sent over. At the end of period $B_0$, e.g., at moment $T_0$, the video information is started again. In blank period $B_0$ it is normal practice (e.g., for the 625 line system) to transmit 12½ lines which are devoid of picture material and therefore produce only a horizontal black band on a normal television receiver. It is usually arranged that these lines are hidden by the mask or escutcheon of a television receiver and are not visible in the picture. Since this is the case additional signals may be added to the blank lines which will not be seen by the normal viewer. The practice of adding information in this way is well known and signals are often added, for instance by the broadcast authorities to enable checks on transmitter performance to be made. Similar techniques have also been proposed for the SECAM and the PAL colour television systems.

In the SECAM and the PAL systems information must be conveyed to enable *two* different states of the transmitted signals to be distinguished at the receiver. In the self-cancellation arrangements according to the present invention the situation is more complex. For these systems there are at least three states to be considered. For this reason a different arrangement must be made as compared with the colour television systems.

Referring again to FIG. 4 when a normal B.T.V. field is to be broadcast then the waveform during the blanking interval immediately preceding that field is as in FIG. 6(*a*) and *no* additional information is added. If, however, an E.T.V. field is to be interposed then (for example) identification pulses are added to the wave form as shown in FIG. 6(*b*). Here, a single pulse is inserted in the first half of some of the normally blank lines of blank period $B_0$. If the E.T.V. field is to be a sum or positive field $V_{sum}$ then only the pulses as shown in FIG. 6(*b*) are added, but if the E.T.V. field is to be a difference or negative field $V_{diff.}$ a second pulse is added during the second half of each of the lines, as shown in FIG. 6(*c*). These pulses can be on any or all of these blank lines but it is usual to leave a few lines clear just before picture starts and 6 lines or so should be quite adequate, leaving room for some broadcast test signals (six are in fact shown in the drawings). So in general it can be said that during *m* lines of period $B_0$ identification signals are added before each E.T.V. field. The number *m* must be smaller than or can be equal to the number of line periods $L_0$ of a blank period $B_0$.

At the E.T.V. receiver the incoming signal waveform must be examined to determine whether these identification pulses are present. If the first pulses are present then these are detected and cause a gate to pass the signal on to the storage device. If the second pulses are present, detection of these causes signal inversion to be made. The detection of these pulses may be effected by making use of suitably timed gates but a further modification can be included which makes a simpler receiver possible and helps to reduce the possibility of an interfering "noise" pulse causing a mistaken recognition to be made. This is to transmit no simple pulses as in FIG. 6 (*b*) and (*c*) but bursts or trains of, for instance, a sinewave modulation.

In one version of the PAL colour television system broadcast experimentally by the B.B.C. in 1963 ("Television U.H.F. Trials 1962–3" Appendix E: published by the B.B.C.) an "identification" signal was used which consisted of a sinewave, of constant frequency and phase, and of one line duration, added to certain of the blank lines. The recognition signal for E.T.V. may have a similar form but it is an advantage if the first pulses have a frequency $f_1$ and the second pulses have a different frequency $f_2$. FIG. 6(*d*) shows the arrangement.

Reference will now be made to FIG. 7 to describe how a typical circuit may work. In FIG. 7 the top parts of the diagram (blocks G, S, I, ST and D) correspond to the similarly labelled blocks in FIG. 4. The rest of the diagram relates to block R of FIG. 4.

The input signal waveform from terminal 10 is passed to the recognition gate RG (and also to the video gate G). This (i.e., the RG gate) is caused to open during the field blanking interval so that the pulses $f_1$ and $f_2$ are passed to the detectors. The opening of the recognition gate RG is controlled by field gate pulses which may be derived from the field synchronising pulse or from the field time base flyback. This signal is shown in FIG. 6(*e*)(*i*) and applied to the recognition gate RG, through lead 12. This field gate pulse opens gate RG at the moment $T_1$ and closes it at the moment $T_2$. So only the identification signals can pass through gate RG to detectors $F_1$ and $F_2$.

The two detectors $F_1$ and $F_2$ contain circuits tuned to the expected frequencies $f_1$ and $f_2$ of the identification pulses, respectively. They also contain envelope detectors so that if a burst of $f_1$ or $f_2$ is present in the signal then an output is produced by the appropriate detector. The output of detector $F_1$ causes the gate G to open for a period of one field. The output of $F_2$ causes the switch S to change over so that the signal is fed via the inverter I for a period of one field. In this arrangement the timing of the recognition gate RG opening is not critical since the recognition signals are present for several lines and it may be expected that the pulse on only one or two lines will be sufficient to produce an output from the detectors. However, the recognition gate RG must be closed before the picture signals commence.

Separation of the two recognition signals $f_1$ and $f_2$ is, in this case, by frequency alone. However, an operation which may be more immune from interference can be obtained by making use of additional monostable circuits $M(a)-M(b)$ shown below the dashed line on the diagram of FIG. 7.

Monostable multivibrator M(*a*) delivers a signal as shown in FIG. 6(*e*)(*ii*) and mono-stable multivibrator M(*b*) a signal as shown in FIG. 6(*e*)(*iii*). For this purpose a field gate pulse as shown in FIG. 6(*e*)(*i*) is applied through lead 13 to multivibrator M(*a*) so that this multivibrator can only come into action during the interval $T_1 \rightarrow T_2$. Moreover line synchronising or line flyback pulses are fed to multivibrator M(*a*) via lead 14. So the first line pulse triggers multivibrator M(*a*) at moment $T_1$ and brings it to its unstable state. Multivibrator M(*a*) automatically returns to its stable state at moment $T_3$. Then the next line pulse brings it in an unstable state at moment $T_4$ whereafter it returns back to its stable state at moment $T_5$. So the signal of FIG. 6(*e*)(*ii*) is developed. This signal is applied through lead 15 to detector $F_1$ so that this detector is only activated when the pulses with frequency $f_1$ are present.

The signal of FIG. 6(*e*)(*ii*) is also applied through lead 16 to mono-stable multivibrator M(*b*). This multivibrator is so arranged, that the rear edges of the pulses shown in FIG. 6(*e*)(*ii*) bring it to its unstable state. So multivibrator M(*b*) is brought to its unstable state at moment $T_3$, returns to its stable state at moment $T_6$ is again triggered at moment $T_5$ and returns at moment $T_7$. So unit M(*b*) delivers the signal as shown in FIG. 6(*e*)(*iii*). This signal is applied through lead 17 to detector $F_2$. Therefore this detector is only activated when pluses with frequency $f_2$ are present.

After passing the gate G and switch S the E.T.V. field signals are passed to the store ST. In general picture stores have two modes of operation: "read-in" and "read-out." There are, however, two additional functions for certain types of store: these are "erasing" which removes the previous picture and (for electron tube storage) "priming" which ensures the store ST is able to accept a new picture.

If storage is by means of a long persistence phosphor no additional circuits are necessary. If storage is on a magnetic drum or tape, erasure takes place during the "read-in" mode and there is no priming. All that is necessary therefore is to switch the store to "read-in" at the commencement of an E.T.V. field an "read-out" after the required number of fields has been stored. This can be accomplished using the output of detector $F_1$. If an electron beam store is used the full cycle Erase, Prime, Read-in, Read-out, must be arranged. For this special mode pulse generator MP is required which forms suitably timed pulses in response to the $F_1$ detector output.

Some stores require a period of time for the erase and prime modes which exceeds the period of one field. For these stores, therefore, a recognition signal immediately preceding an E.T.V. field may not be adequate. These two approaches are possible:

(i) If the E.T.V. fields are at regular intervals the mode pulse generator can be caused to automatically commence the erase mode before a new field is expected.

(ii) If the E.T.V. fields are at varying intervals (or in order to overcome a possible gap in the read-out time which may occur by method (i)), additional recognition pulses may be transmitted prior to the main recognition pulses (i.e., between two preceding fields), so that the mode pulse generator may be put into operation before the E.T.V. fields are transmitted.

The arrangement of FIG. 7 may be modified in various ways. For instance, switch S may be operated by both $F_1$ and $F_2$ outputs to make sure that the switch is restored to the "direct" position when a positive E.T.V. field is present.

So far all the visual cancellation examples described were based on arrangements in which alternate *fields* of the interposed E.T.V. signal are inverted, so as to cause visual cancellation in a normal (B.T.V.) receiver. It is quite possible to use a system in which successive *lines* of the *same* field are inverted.

In order to explain this clearly a standard notation must be adopted for the lines and fields. The standard used here is in accordance with the B.B.C. publication mentioned above (see page 55). The first interposed E.T.V. field is designated as a first *even* field (FIG. 8(*a*)(*i*)) and the lines are consecutively numbered 1, 2, 3, 4 . . . 312(½). The second, interlaced, E.T.V. field associated with the first field is designated as a second *odd* field (FIG. 8(*a*)(*ii*)), and the line numbers are those following consecutively from the even field, i.e., 312(½), 313, 314, 315 . . . 625.

In one line-alternating system which may be used the positive or sum E.T.V. signals $V_{sum}$ are transmitted on (e.g.) all odd numbered lines of both fields of any interposed pair of fields and negative or difference signals $V_{diff.}$ are transmitted on all even lines. This is illustrated diagrammatically in FIG. 8(*a*). This means that the signal $V_{sum}$ is transmitted during lines 19, 21, 23 . . . 331, 333 . . . and so on, and the signal $V_{diff.}$ is transmitted during lines 20, 22, 24 . . . 332, 334 . . . and so on. This is indicated by the − and + signs near the lines of FIG. 8(*a*).

The recognition circuits must now determine:

(a) Whether an E.T.V. signal is present.

(b) On which lines it is positive (or "sum") and on which it is negative (or "difference").

Recognition whether an E.T.V. field is present or not may be accomplished as before. In this case, however, the switch S (FIG. 7) must open and close on alternate lines of each E.T.V. field. An oscillator circuit can be used to drive the switch at the correct rate and this may be synchronised by line synchronisation pulses to ensure that the switch S changes over at the right times. However, in order to ensure that the switch position is correctly phased and the signals appropriately routed it is desirable to include some means for indicating on which lines the switch should be in (say) the "direct" position. This may be done either by introducing very short recognition pulses (or bursts) on the back porch period of the lines in question (i.e., during line blanking) or by introducing pulses on, for instance, alternate lines in the 12½ line field-blanking period $B_0$. These pulses would be used to provide additional synchronisation for said oscillator. This problem of line switch phase correction is analogous to that encountered in the SECAM and PAL colour television systems and similar circuit techniques can be employed.

Figure 8A:
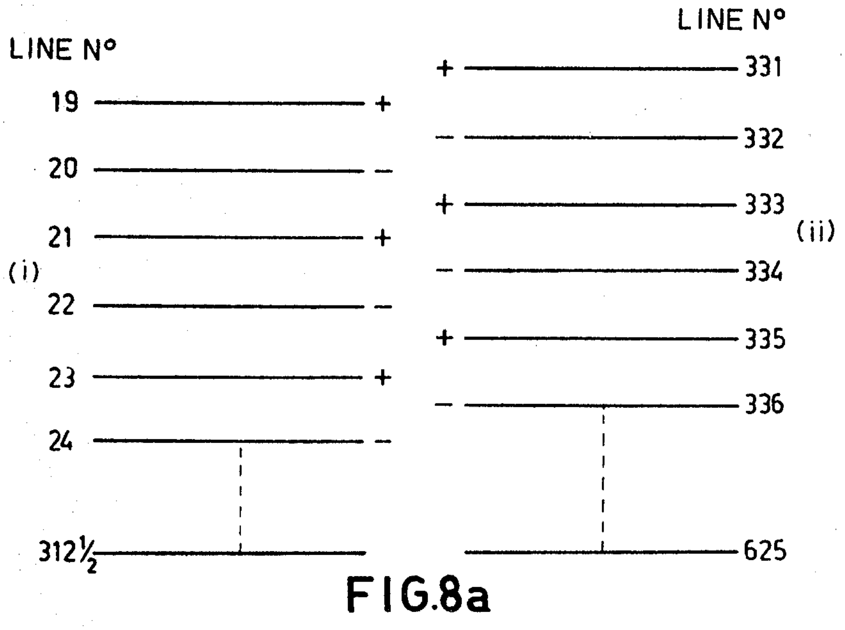
FIG. 8 shows several fields as scanned in the present system.
Figure 8B:
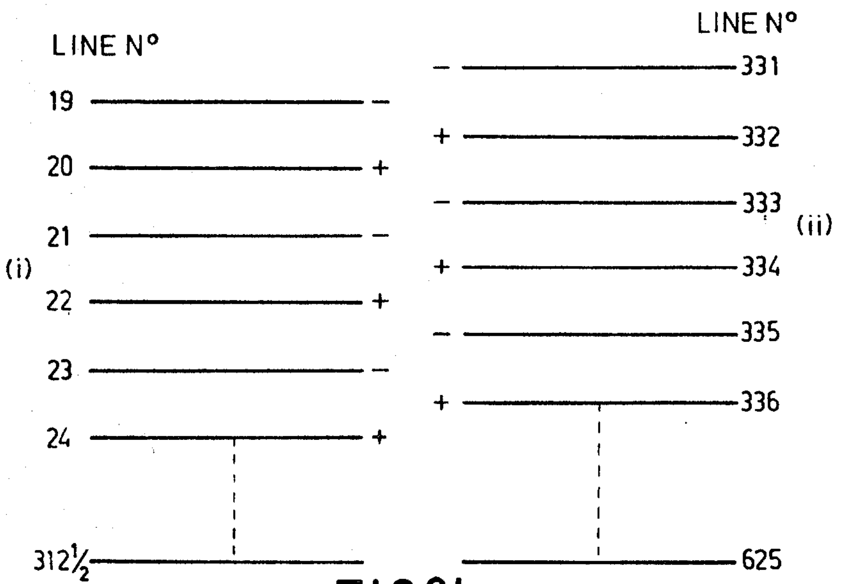

If a 4-field sequence is being transmitted (as described above) it is advantageous to alter the polarity of switching for the 3rd and 4th fields as indicated in FIG. 8(*b*). Here there is a third even field (FIG. 8(*b*)(*i*)), and a fourth odd field (FIG. 8(*b*)(*ii*)). However, at the transmitter end sum and difference signals are changed as will be clear when comparing the — and + signs of FIG. 8(*a*) and 8(*b*). In this way there is cancellation between the same lines in adjacent pictures (e.g., lines 19 of fields 1 and 3) and between adjacent lines in the same field (e.g., lines 19 and 20). This practice is also similar to the procedure adopted in colour television (see the aforesaid B.B.C. document, page 71, Appendix E.4).

As a further alternative a two-field or (preferably) four-field line alternating method or system as described with reference to FIGS. 8(*a*) and 8(*b*) may employ lines transmitted in pairs in which the video modulation of one line is related to the continuous programme while the video modulation of the other line is related to the discontinuous programme. In this case the B.T.V. lines may, for example, be the "+" lines of FIGS. 8(*a*) or (8)(*a*) and 8(*b*) while the E.T.V. lines are the "—" lines.

What is claimed is:

1. A method for transmitting a broadcast television and a discontinuous television program composed of a series of still images in a common channel, said method comprising sequentially transmitting a plurality of fields with signals that are a function solely to said broadcast television program and a substantially lower number of fields with signals that are a function at least in part to said discontinuous program, and transmitting identification signals indicating the location of said lower number of fields.

2. The method of claim 1 wherein said signals that are a function of said discontinuous program are transmitted during pairs of adjacent fields, and the video modulation of signals in one field of said pair of fields is inverted with respect to the video modulation of the other field, whereby the visual effect of said discontinuous program is substantially cancelled in broadcast television receivers receiving said transmitted signals.

3. The method of claim 1 wherein the video modulation of signals that are a function of said discontinuous program are inverted in alternate lines of a field of said lower number of fields, whereby the visual effect of said discontinuous program is substantially cancelled in broadcast television receivers receiving said transmitted signals.

4. The method of claim 1 wherein said signals that are a function of said discontinuous program are transmitted during adjacent pairs of fields, said last mentioned signals being a function of the sum of video signals related to said broadcast program and discontinuous program in one field of said pair of fields and a function of the difference of video signals related to said broadcast program and discontinuous program in the other field of said pair of fields, whereby the visual effect of said discontinuous program is minimized in broadcast television receivers receiving said transmitted signals.

5. The method of claim 1 wherein the lines of the fields of said lower number of fields are modulated alternately with signals that are a function of the sum of video signals related to said broadcast and discontinuous programs and signls that are a function of the difference of video signls related to said broadcast and discontinuous programs, whereby the visual effect of said discontinuous program is minimized in broadcast television receivers receiving said transmitted signals.

6. The method of claim 1 wherein the lines of fields of said lower number of fields are modulated alternately with video signals that are a function solely of said broadcast program and video signals that are a function solely of said discontinuous program, whereby the visual effect of said discontinuous program is minimized in broadcast television receivers receiving said transmitted signals.

7. A television system comprising a transmitter and a receiver, said transmitter comprising a source of first video signals corresponding to a continuous broadcast television program, a source of second video signals corresponding to a discontinuous television program composed of a series of still images, a source of identification signals, means for transmitting said first and second video signals and identification signals in cycle, whereby each cycle is comprised of a plurality of fields that are related solely to said broadcast program and a substantially lower number of fields related to said discontinuous program, said receiver comprising means for receiving said transmitted signals, storage and display means, and means responsive to said identification signal for applying only video signals corresponding to said lower number of fields to said storage and display means.

8. A television transmission system comprising a transmitter, a conventional broadcast television receiver, and a second television receiver, said transmitter comprising a source of first video signals corresponding to a continuous broadcast television program, a source of second video signals corresponding to a discontinuous television program composed of a series of still images, a source of identification signals, and means for transmitting said first and second video signals and identification signals in cycles whereby each cycle is comprised of a plurality of first fields that are related solely to said broadcast program and a substantially lower number of fields related to said discontinuous program, part of the signals of said second fields being video modulated in inverted form whereby the visual effect of said discontinuous program is minimized in said conventional broadcast receiver, said second receiver comprising means for receiving said transmitter signals, storage and display means, and means responsive to the reception of said identification signals for applying only video signals corresponding to said lower number of fields to said storage and delay means.

9. The transmission system of claim 8 wherein said identification signals comprise first and second identification signals, and said receiver comprises inverting means, means responsive to said first identification signals for applying receiver video signals of said lower number of fields directly to said storage and display means, and means responsive to said second identification signals to apply said part of the signals modulated in inverted form to said storage and display means by way of said inverting means.

10. The transmission system of claim 8 wherein said identification signals comprise first identification signals for identifying uninverted parts of the video signal of said lower number of fields and second identification signals for identifying said inverted parts of the video signal of said lower number of fields, said storage and display means comprises first and second storage devices, a display device, and means converting said display device to said first and second storage devices, and said receiver further comprises means responsive to said first and second identification signals for applying signals corresponding to said uninverted and inverted parts respectively to said first and second storage devices respectively.

References Cited

UNITED STATES PATENTS

| | | | |
|---|---|---|---|
| 2,877,290 | 3/1959 | Le Blan | 178—5.2 |
| 2,975,234 | 3/1961 | Le Blan | 178—5.2 |

RALPH D. BLAKESLEE, Primary Examiner

B. LEIBOWITZ, Assistant Examiner

U.S. Cl. X.R.

178—6, 7.2